US012592343B2

(12) United States Patent
Mori et al.

(10) Patent No.: US 12,592,343 B2
(45) Date of Patent: Mar. 31, 2026

(54) COMPOSITE CAPACITOR

(71) Applicant: NICHICON CORPORATION, Kyoto (JP)

(72) Inventors: Takashi Mori, Kyoto (JP); Takashi Nose, Kyoto (JP)

(73) Assignee: NICHICON CORPORATION, Kyoto (JP)

( * ) Notice: Subject to any disclaimer, the term of this patent is extended or adjusted under 35 U.S.C. 154(b) by 345 days.

(21) Appl. No.: 18/556,875

(22) PCT Filed: Jun. 30, 2022

(86) PCT No.: PCT/JP2022/026230
§ 371 (c)(1),
(2) Date: Oct. 23, 2023

(87) PCT Pub. No.: WO2023/002831
PCT Pub. Date: Jan. 26, 2023

(65) Prior Publication Data
US 2024/0222023 A1    Jul. 4, 2024

(30) Foreign Application Priority Data

Jul. 19, 2021    (JP) ................................. 2021-118713

(51) Int. Cl.
*H01G 4/224*        (2006.01)
*H01G 4/228*        (2006.01)
(Continued)

(52) U.S. Cl.
CPC ............. *H01G 4/224* (2013.01); *H01G 4/228* (2013.01); *H01G 4/32* (2013.01); *H01G 4/38* (2013.01)

(58) Field of Classification Search
CPC .......... H01G 4/224; H01G 4/228; H01G 4/32; H01G 4/38; H01G 4/40; H01G 2/103;
(Continued)

(56) References Cited

U.S. PATENT DOCUMENTS

2009/0059467 A1*    3/2009    Grimm .................... H01G 9/10
                                                                    361/301.5
2010/0132193 A1*    6/2010    Yoshinaga ............... H01G 4/38
                                                                    29/874
(Continued)

FOREIGN PATENT DOCUMENTS

JP        S62-117312  A        5/1987
JP        H01-153627  U        10/1989
(Continued)

OTHER PUBLICATIONS

International Search Report for International Application No. PCT/JP2022/026230 dated Sep. 20, 2022, Japan, 2 pages.
Office Action of corresponding Korean patent application No. 10-2023-7036850 dated Oct. 11, 2024, Korea, 5 pages.

*Primary Examiner* — Timothy J. Dole
(74) *Attorney, Agent, or Firm* — United IP Counselors, LLC

(57) ABSTRACT

To provide a composite capacitor that withstands higher voltages and handles the high-frequency operations of switching elements. In a main capacitor 10 formed of a metallized film, first and second plate conductor terminals 12c, 13c as cathode and anode are continuously connected to first and second plate conductor bodies 12a, 13a. In a parallel plate sub-capacitor 20, a sheet dielectric 21 is inserted into a gap between opposed first and second electrode plate bodies 22a, 23a. First and second electrode plate terminals 22c, 23c are continuously connected to the first and second electrode plate bodies 22a, 23a. The main capacitor 10 and the sub-capacitor 20 are disposed in close proximity to each other. The first and second plate conductor (Continued)

terminals 12c, 13c and the first and second electrode plate terminals 22c, 23c can be connected to each other by the terminals of the same polarity.

14 Claims, 12 Drawing Sheets

(51) Int. Cl.
H01G 4/32 (2006.01)
H01G 4/38 (2006.01)

(58) Field of Classification Search
CPC .......... H01G 2/106; H01G 4/232; H01G 2/10; Y02E 60/13
See application file for complete search history.

(56) References Cited

U.S. PATENT DOCUMENTS

| | | | | |
|---|---|---|---|---|
| 2014/0311788 A1* | 10/2014 | Park | ...................... | H01G 4/232 361/301.4 |
| 2015/0256096 A1* | 9/2015 | Nishizawa | .............. | B60L 50/61 361/306.1 |
| 2017/0229246 A1* | 8/2017 | Nishiyama | ............... | H01G 4/30 |

FOREIGN PATENT DOCUMENTS

| | | | | | |
|---|---|---|---|---|---|
| JP | 2005347561 A | * | 12/2005 | | |
| JP | 2008-130641 A | | 6/2008 | | |
| JP | 2010/067514 A1 | | 5/2012 | | |
| JP | 2013-030577 A | | 2/2013 | | |
| JP | 2017-059572 A | | 3/2017 | | |
| KR | 20110101417 A | * | 9/2011 | .............. | H01G 4/30 |

* cited by examiner

COMPOSITE CAPACITOR

CROSS-REFERENCE TO RELATED APPLICATIONS

This application is a National Stage Entry application of PCT International Application No. PCT/JP2022/026230, filed on Jun. 30, 2022, which claims the priority benefit of Japanese Patent Application No. 2021-118713, filed on Jul. 19, 2021, the entire contents of both of which are hereby incorporated by reference.

BACKGROUND

1. Technical Field

The present invention relates to a composite capacitor.

2. Description of the Background

In recent inverter smoothing capacitors, there is a need to reduce noise as switching elements operate faster. An inverter has three or two sets of legs. Each leg is a pair of complementary high-side and low-side switching elements connected in series and turned ON/OFF alternately. Recently, the leg switching elements operate faster and faster, increasing the intensity of induced noise.

A smoothing capacitor (main capacitor) is bridge-connected to a high-side power line and a low-side power line connecting the legs in parallel in the inverter for supplying power to any AC load, such as a motor. For PWM control of the inverter, the DC voltage level of the smoothing capacitor should be stable.

Fluctuations in the DC voltage level due to the high-frequency noise associated with the faster switching operations will hinder precise control of electrical devices, including the motor as a load.

In view of the above, composite capacitors has been developed. In a composite capacitor, a sub-capacitor that is a noise suppression capacitor of a small capacitance, is connected in parallel with the main capacitor.

In conventional composite capacitors, the sub-capacitor for noise suppression is a metallized film capacitor, as is the main capacitor for smoothing. (e.g., see WO 2010/067514 A1)

A conventional example is described below with reference to FIGS. 10 to 12. A composite capacitor shown in FIGS. 10 to 12 includes a main capacitor 50, capacitor elements 51, a plate conductor (bus bar) 52a, a plate conductor 52b, a sub-capacitor 60, and capacitor elements 61. The capacitor elements 51 have a large capacitance in the main capacitor 50. The plate conductor (bus bar) 52a (FIG. 12) is a cathode (N-pole) conductor in the main capacitor 50. The plate conductor 52b is an anode (P-pole) conductor in the capacitor 50. The capacitor elements 61 have a small capacitance in the sub-capacitor 60.

In the conventional example, the cathode is the bottom side and the anode is the top side. The large capacitance capacitor elements 51 are for smoothing. The small capacitance capacitor elements 61 are for noise reduction.

The smoothing main capacitor 50 includes a plurality of large capacitance capacitor elements 51. Each capacitor element 51 is formed of a wound metallized film. The metallized film is a dielectric film having electrodes deposited on its film surfaces. Each capacitor element 51 is structured by the wound or laminated metallized film and metal electrodes (metallicon) at its axial ends. The plurality of large capacitance smoothing capacitor elements 51 are disposed in parallel and in contact with each other. The cathode (N-pole) plate conductor 52a is electrically and mechanically connected to the metal electrode at the axial bottom of each capacitor element 51. The anode (P-pole) plate conductor 52b is electrically and mechanically connected to the metal electrode at the axial top of each capacitor element 51.

As shown in FIG. 12, the plate conductor 52b includes a plate conductor body $52b_1$, a plate conductor extension $52b_2$, and plate conductor terminals $52b_3$. The plate conductor body $52b_1$ extends horizontally. The plate conductor extension $52b_2$ rises from the plate conductor body $52b_1$ and is bent to further extend horizontally. The plate conductor terminals $52b_3$, which are branched in three pieces from the free end of the plate conductor extension $52b_2$, extend in an inverted L-shape.

The plate conductor 52a is similar in shape to the plate conductor 52b. The plate conductor 52a includes a plate conductor body $52a_1$ in a horizontal position, a plate conductor extension $52a_2$, and three plate conductor terminals $52a_3$ of an inverted L-shape.

The anode plate conductor terminals $52b_3$ and the cathode plate conductor terminals $52a_3$ are paired and alternately arranged laterally.

Thus, the smoothing capacitor elements 51 and the pair of plate conductors 52a, 52b form the main capacitor 50 of a relatively large capacitance.

Each of the noise suppression capacitor elements 61 in the sub-capacitor 60 of a relatively small capacitance is also formed of a wound metallized film. The sub-capacitor 60 is similar in structure to the capacitor element 51 except that its volume (lateral, depth and axial dimensions) is smaller. The capacitor element 61 is smaller in capacitance than the capacitor element 51. The capacitor element 61 is smaller in volume than the capacitor element 51. For example, the longitudinal, lateral, and height dimensions of the capacitor element 61 are smaller than those of the capacitor element 51.

The composite capacitor of the conventional example includes two capacitor elements 61 and four capacitor elements 51. Accordingly, as a whole, the capacitance of the sub-capacitor 60 is sufficiently smaller than that of the main capacitor 50.

Two capacitor elements 61 have their axial bottom metal electrodes connected to each other via a plate conductor. One capacitor element 61 is connected to the plate conductor body $52b_1$ of the plate conductor 52b. The other capacitor element 61 is connected to a ground terminal 62b.

FIG. 11 shows the state in which an outer case 70 houses a capacitor unit with terminals, which consists of the plurality of capacitor elements structured as described above and the plate conductor (bus bar) connected thereto. Then, the outer case 70 is filled with molding resin by injection so that the capacitor unit is protected.

BRIEF SUMMARY

Recent faster switching (higher frequency) of inverter equipment has increased noise in the high-frequency band. Such high frequency noise is becoming a regulatory target due to its impact on equipment performance and EMC (electromagnetic compatibility) standards.

Conventionally, ceramic capacitors or low capacitance metallized film capacitors have been used as noise suppression capacitors. However, in some cases, ceramic capacitors cannot fully meet the higher voltage withstand requirements.

In addition, metallized film capacitors have difficulty in achieving the microcapacitance ([pF] order) that is optimum for addressing high-frequency noise in the high-frequency environment associated with faster switching speeds.

The conventional noise suppression capacitor is similar in structure to the body smoothing capacitor. That is, a noise suppression metallized film capacitor has its metal electrodes at its axial ends electrically connected to an external lead-out terminal (bus bar). The conventional noise suppression capacitor has a relatively large capacitance, e.g., 0.001 to 10 [μF].

Noise suppression sub-capacitors that address high-frequency noise, which is the noise suppression target of the present invention, are capacitors having a capacitance of the order of 50 to 200 [pF] at most, and desirably of the order of 10 to 50 [pF].

Ceramic capacitors have conventionally been used as small capacitance capacitors. A ceramic capacitor has a multilayer structure consisting of ultra-thin dielectric layers and ultra-thin internal electrodes. This structure makes it difficult to attain resistance to higher voltages (higher voltage withstand capability).

On the other hand, metallized film capacitors with a capacitance low enough to meet the requirement are extremely difficult to realize. Just an additional winding of the metallized film increases the capacitance by about 1 [nF]. Therefore, use of the capacitors having a relatively large capacitance of more than 1 [nF] is inevitable, which results in insufficient high-frequency noise reduction.

For the above reasons, reducing the capacitance of noise suppression capacitors required by the trend toward higher switching speeds of complementary high-side and low-side switching elements is extremely challenging. Simply minimizing the capacitance of noise suppression capacitors is not enough to handle the high-speed switching required in recent years. The requirement for higher voltage withstand capability cannot be met either.

An object of the present invention is to provide a composite capacitor that withstands higher voltages and handles the high-frequency operations of switching elements.

One aspect of the present invention provides a composite capacitor including:

a main capacitor including a capacitor element formed of a wound or laminated metallized film made up of a dielectric film and electrodes deposited on the dielectric film, the capacitor element including first and second metal electrodes at its axial ends, a first plate conductor including a first plate conductor body connected to the first metal electrode, a first plate conductor extension extending from the first plate conductor body, and a first plate conductor terminal extending from the first plate conductor extension, a second plate conductor including a second plate conductor body connected to the second metal electrode, a second plate conductor extension extending from the second plate conductor body, and a second plate conductor terminal extending from the second plate conductor extension; and a parallel plate sub-capacitor smaller in capacitance than the main capacitor, the sub-capacitor including a first electrode plate including a first electrode plate body, a first electrode plate extension extending from the first electrode plate body, and a first electrode plate terminal extending from the first electrode plate extension and connectable to the first plate conductor terminal, a second electrode plate including a second electrode plate body disposed in parallel with the first electrode plate extension with a predetermined minor gap, a second electrode plate extension extending from the second electrode plate body, and a second electrode plate terminal extending from the second electrode plate extension and connectable to the second plate conductor terminal, and a sheet dielectric held between the first electrode plate body and the second electrode plate body.

The present invention provides a composite capacitor that withstands higher voltages and handles high-frequency operations of switching elements.

DETAILED DESCRIPTION

Figure 1:
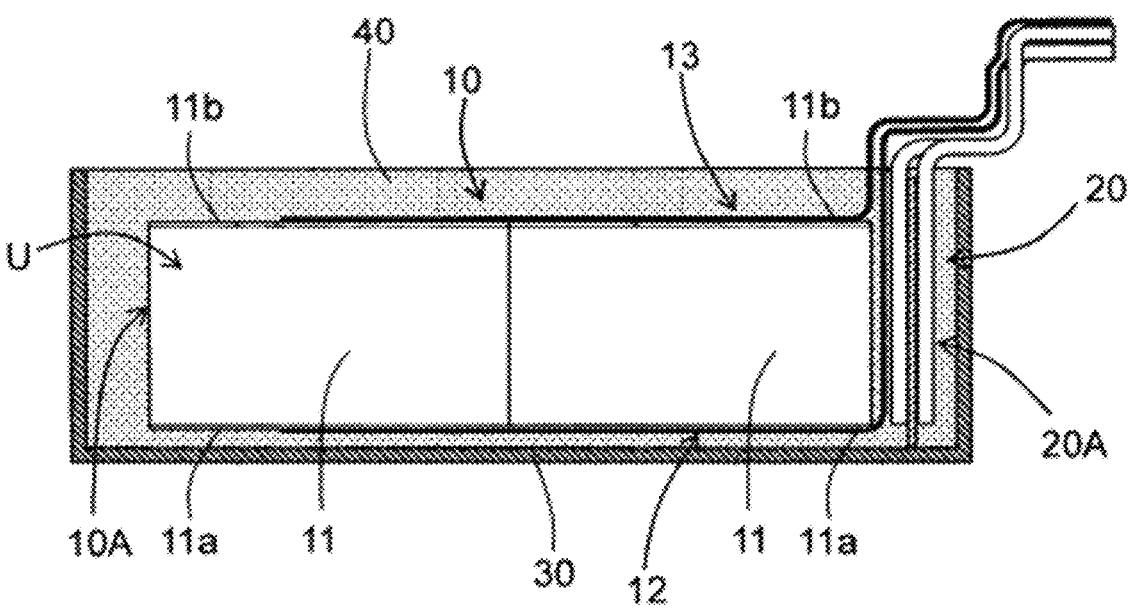
FIG. 1 is a vertical cross-sectional view of a composite capacitor according to an embodiment.

A composite capacitor according to an embodiment is described below.

The composite capacitor in FIGS. 1 to 9 includes a main capacitor 10 and a sub-capacitor 20. The main capacitor 10 has a relatively large capacitance. The sub-capacitor 20 has a relatively small capacitance.

The main capacitor 10 includes capacitor elements 11, first metal electrodes 11*a*, second metal electrodes 11*b*, a first plate conductor (bus bar) 12, and a second plate conductor 13. The first metal electrodes 11*a* are formed at the lower surfaces of the capacitor elements 11. The second metal electrodes 11*b* are formed at the upper surfaces of the capacitor elements 11. The sub-capacitor 20 includes a sheet dielectric 21, a first electrode plate 22, and a second electrode plate 23.

Figures 2A, 2B, 2C:
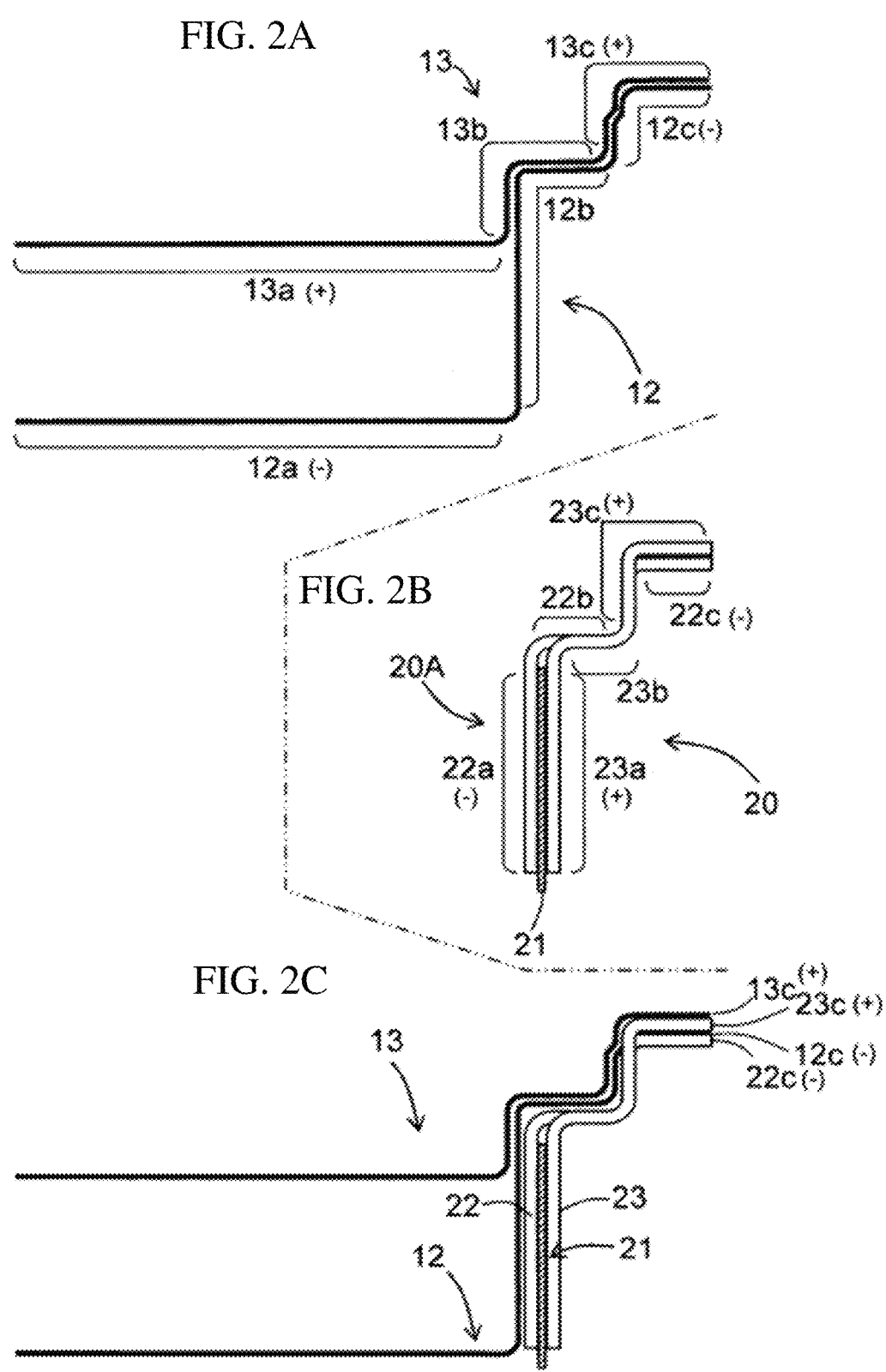
FIG. 2A is a side view of a first plate conductor and a second plate conductor according to the embodiment.
FIG. 2B is a side view of a first electrode plate and a second electrode plate.
FIG. 2C is a side view of the first and second plate conductors and the first and second electrode plates combined with each other.
Figure 3:
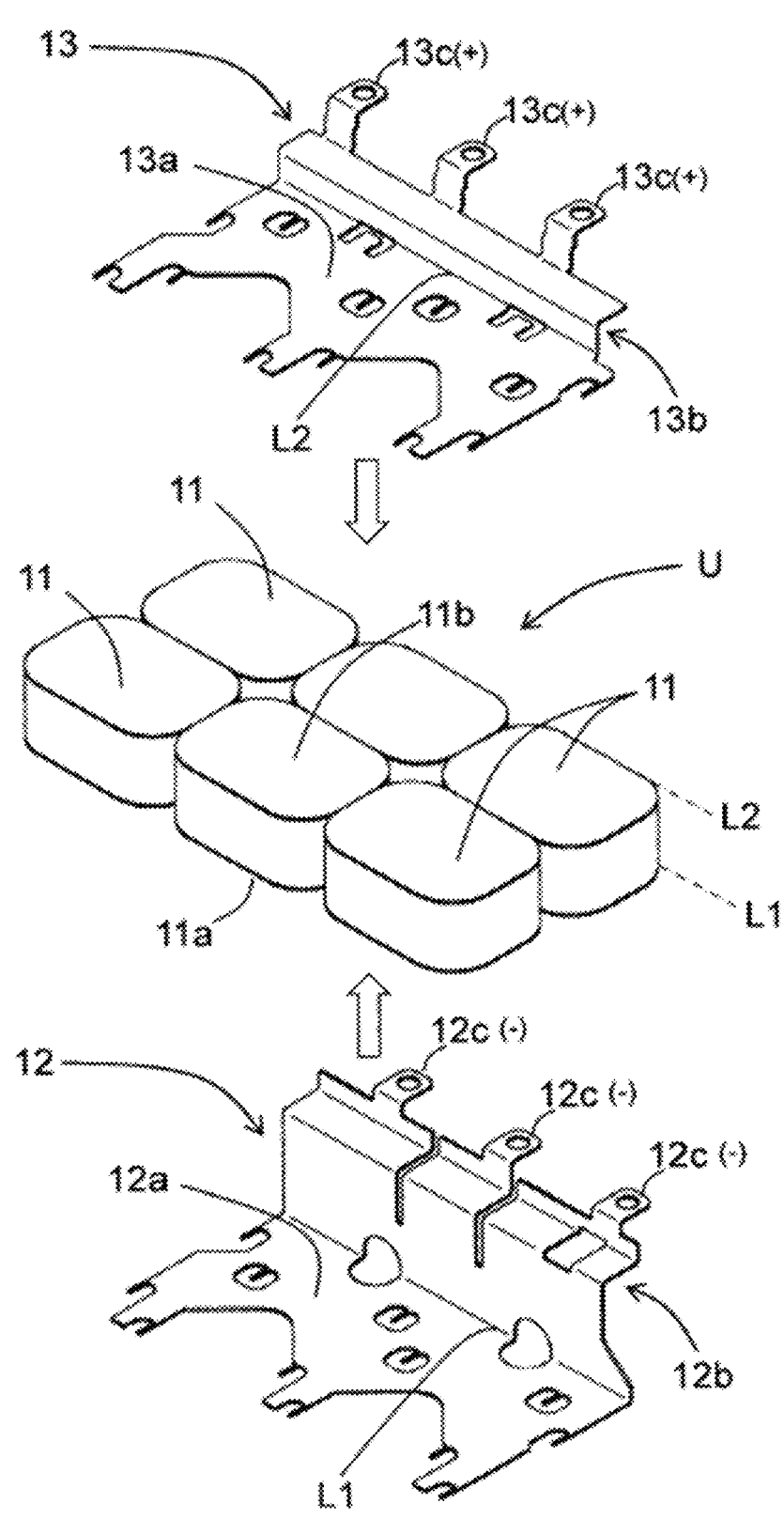
FIG. 3 is an exploded perspective view of a capacitor unit, the first plate conductor, and the second plate conductor in a main capacitor according to the embodiment.
Figure 4:
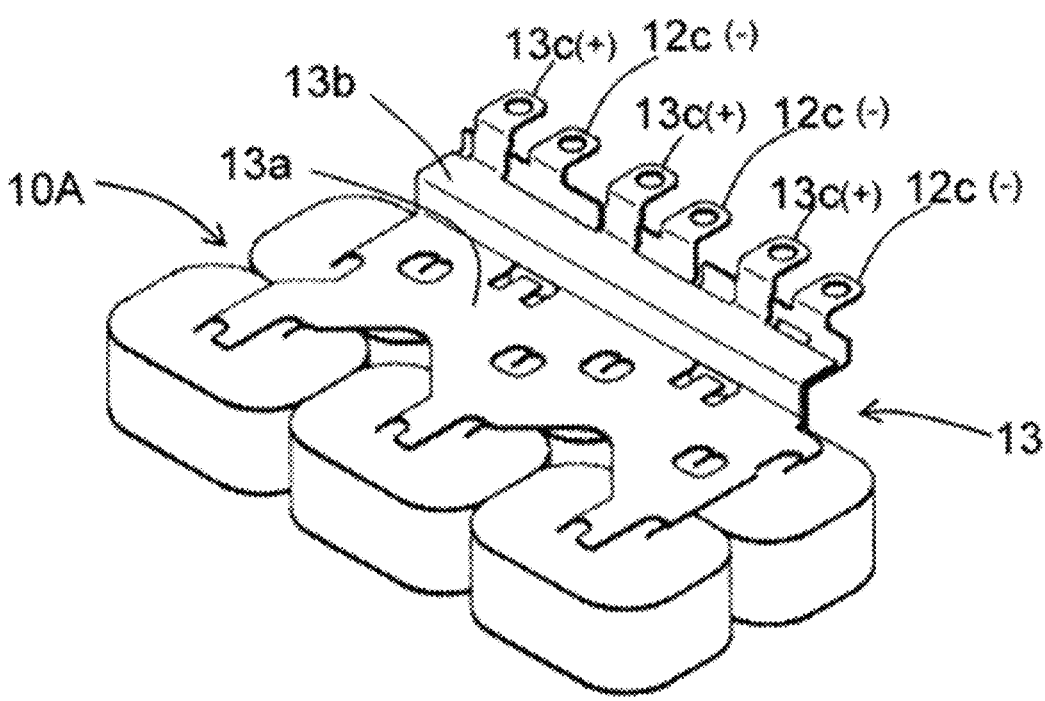
FIG. 4 is a perspective view of the combined capacitor unit, first plate conductor, and second plate conductor in the main capacitor according to the embodiment.
Figure 5:
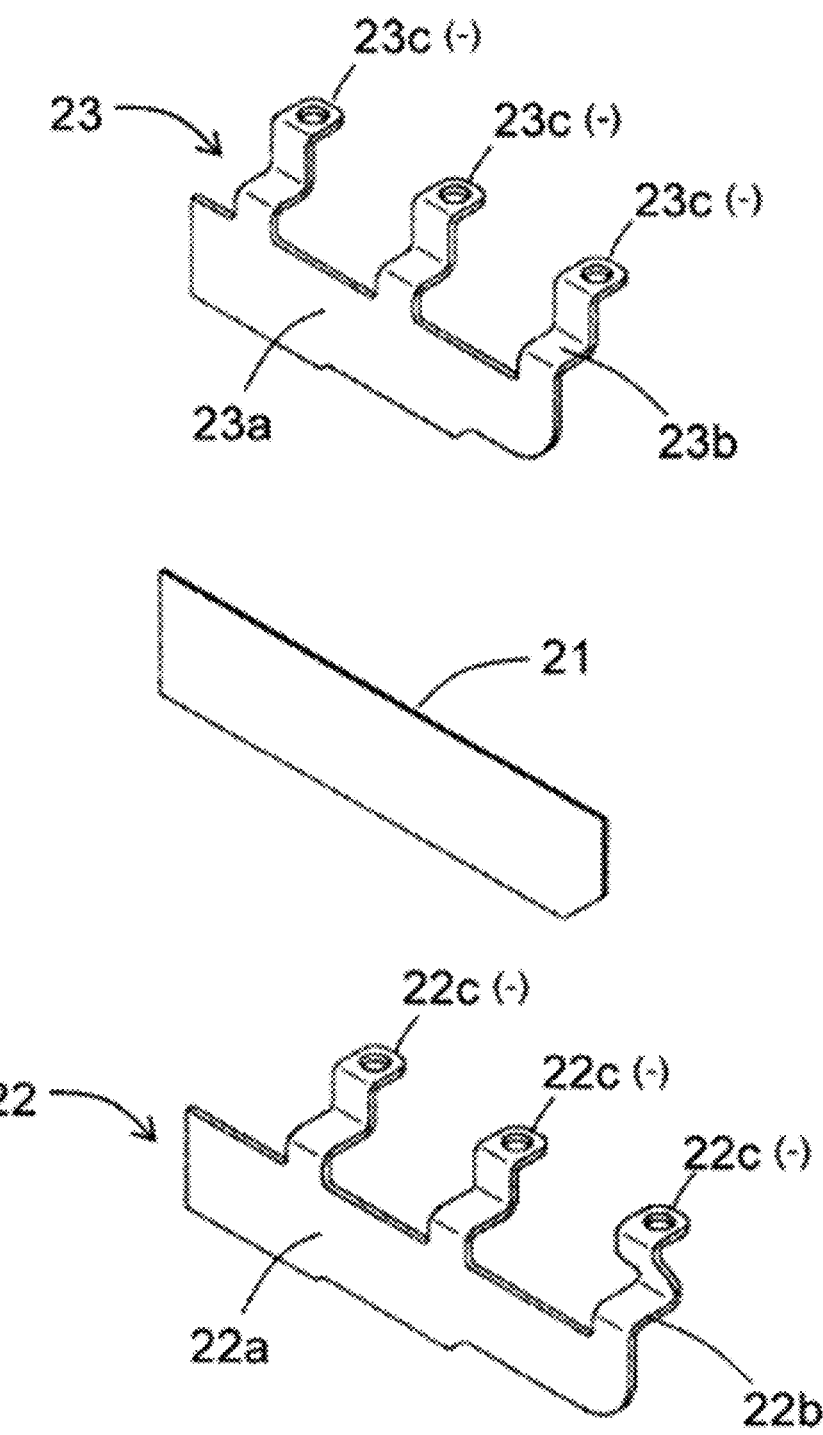
FIG. 5 is an exploded perspective view of a sheet dielectric, a first electrode plate, and a second electrode plate in a sub-capacitor according to the embodiment.
Figure 6:
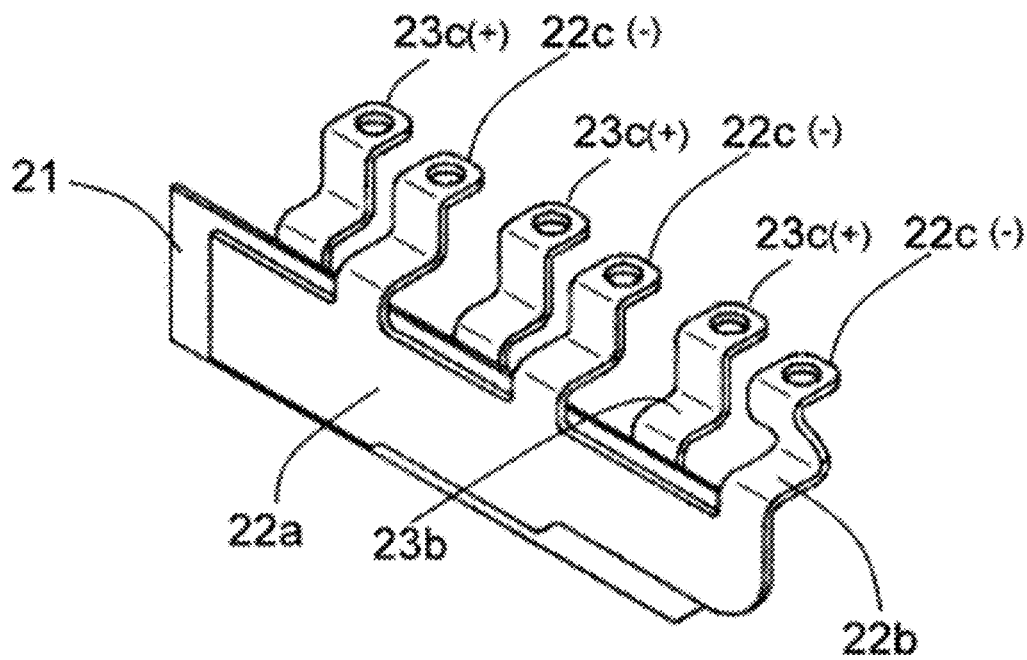
FIG. 6 is a perspective view of the combined sheet dielectric, first electrode plate and second electrode plate in the main capacitor according to the embodiment.
Figure 7:
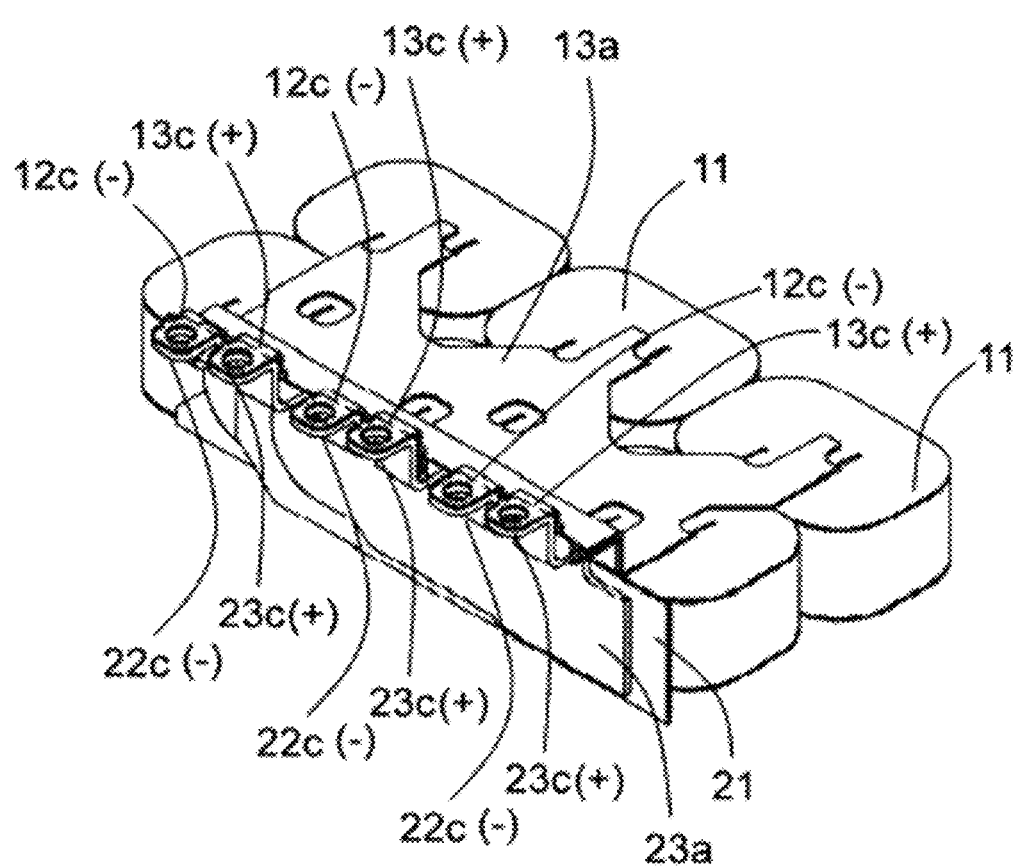
FIG. 7 is a perspective view of the composite capacitor according to the embodiment as seen from the back side.

As shown in FIG. 2A, the first plate conductor 12 on the lower side includes a first plate conductor body 12*a*, a first plate conductor extension 12*b*, and first plate conductor terminals 12*c*. The second plate conductor 13 on the upper side includes a second plate conductor body 13*a*, a second plate conductor extension 13*b*, and second plate conductor terminals 13*c*. The first plate conductor 12 and the second plate conductor 13 are each made of a thin, flat, and highly conductive metal plate.

As shown in FIG. 2B, the first electrode plate 22 on the inner side includes a first electrode plate body 22*a*, first electrode plate extensions 22*b*, and first electrode plate terminals 22*c*. The second electrode plate 23 on the outer side includes a second electrode plate body 23*a*, second electrode plate extensions 23*b*, and second electrode plate terminals 23*c*. The first electrode plate 22 and the second electrode plate 23 are each made of a thin, flat, and highly conductive metal plate.

The first plate conductor 12, the second plate conductor 13, the first electrode plate 22, and the second electrode plate 23 are made of metal and are so malleable that they can be easily formed into the desired shape.

The main capacitor 10 includes the capacitor elements 11 and the pair of plate conductors 12, 13. The capacitor elements 11 are each formed of a wound metallized film. The metallized film is made of a dielectric film having metal deposited on its film surfaces. The main capacitor 10 may be formed by lamination instead of winding. Each capacitor element 11 is columnar, and elliptical as seen in a plan view. The first metal electrode 11*a* as the cathode is formed at the axial lower-end surface of the capacitor element 11. The second metal electrode 11*b* as the anode is formed at the axial upper-end surface of the capacitor element 11.

The main capacitor 10 can be formed as an assembly (semi-finished product) that can be handled independently.

A plurality of capacitor elements 11 are arranged in parallel in a matrix and form a capacitor unit U, a group of capacitor elements. The capacitor elements 11 are regularly arranged in a matrix with their axes parallel to each other and their side surfaces (circumferential surfaces) abutting each other. The capacitor unit U is substantially cuboidal as a whole.

The first plate conductor 12 consists entirely of a piece of thin conductive metal plate (e.g., copper plate). The first plate conductor body 12*a* is electrically and mechanically connected to all the first metal electrodes 11*a* at the lower end surfaces of the capacitor elements 11 constituting the capacitor unit U by, for example, soldering. The first plate conductor extension 12*b* extends integrally by being bent in an inverted L-shape at the edge of the first plate conductor body 12*a*. The first plate conductor terminals 12*c* extend integrally by being bent in an inverted L-shape at the edge of the first plate conductor extension 12*b*. Line L1 along which the first plate conductor extension 12*b* is bent relative to the first plate conductor body 12*a* is the site corresponding to the edges of the first metal electrodes 11*a* in the capacitor unit U.

The second plate conductor 13 consists entirely of a piece of thin conductive metal plate (e.g., copper plate). The second plate conductor body 13*a* is electrically and mechanically connected to all the second metal electrodes 11*b* at the upper end surfaces of the capacitor elements 11 constituting the capacitor unit U by, for example, soldering. The second plate conductor extension 13*b* extends integrally by being bent in an inverted L-shape at the edge of the second plate conductor body 13*a*. The second plate conductor terminals 13*c* extend integrally by being bent in an inverted L-shape at the edge of the second plate conductor extension 13*b*. Line L2 along which the second plate conductor extension 13*b* is bent relative to the second plate conductor body 13*a* is the site corresponding to the edges of the second metal electrodes 11*b* in the capacitor unit U, immediately above the line L1.

The capacitor unit U and the first and second plate conductor bodies 12*a*, 12*b* constitute a main capacitor main part 10A.

The vertical portion of the first plate conductor extension 12*b* is bent vertically upward so as to approach the vertical portion of the second plate conductor extension 13*b*, and extends parallel to one of the planar side surfaces, i.e., outer circumferential surfaces, of the capacitor unit U. This realizes the compact structure of the composite capacitor.

As shown in FIG. 2A, the first plate conductor extension 12*b* and the second plate conductor extension 13*b* are opposed to each other with a slight gap while maintaining the inverted L-shape.

The inverted L-shaped plate conductor extensions 12*b*, 13*b* extend in an elongated manner along the long side of the capacitor unit U.

The first plate conductor body 12*a* has the first plate conductor terminals 12*c* as the cathode on the free-end side via the first plate conductor extension 12*b*. The second plate conductor body 13*a* has the second plate conductor terminals 13*c* as the anode on the free-end side via the second plate conductor extension 13*b*. The first plate conductor terminals 12*c* as the cathode and the second plate conductor terminals 13*c* as the anode are paired.

The first and second plate conductor extensions 12*b*, 13*b*, forming a cathode and anode pair, are planarly opposed to each other in a close but non-contacting manner so as to be in parallel and insulated from each other. An insulating sheet (not shown) is interposed in the gap between the plate conductor extensions 12*b*, 13*b*.

The first and second plate conductor terminals 12*c*, 13*c* are both a plurality of branched lingulate pieces each having an inverted L-shape. The first plate conductor terminals 12*c* and the second plate conductor terminals 13*c* are disposed at substantially the same height with a horizontal gap from each other. Each plate conductor terminal 12*c* is disposed between adjacent second plate conductor terminals 13*c*. Each second plate conductor terminal 13*c* is disposed between adjacent first plate conductor terminals 12*c*.

Since the first and second plate conductor terminals 12*c*, 13*c* have the lingulate shape, the plurality of first plate conductor terminals 12*c* and the plurality of second plate conductor terminals 13*c* can be alternately arranged at substantially the same height and by substantially the same projection.

By matching the shapes and dimensions between the main capacitor 10 and the sub-capacitor 20 in advance, alignment can be performed quickly and easily by adjusting the relative positions of the main capacitor main part 10A and a sub-capacitor main part 20A.

The sub-capacitor main part 20A, which is the main part of the sub-capacitor 20, is a parallel plate small capacitance capacitor for suppressing high-frequency noise. The first and second electrode plate bodies 22a, 23a, a cathode and anode pair, are opposed to each other in parallel with a small gap. The sheet dielectric 21 is inserted and held in the gap between the opposed first and second electrode plate bodies 22a, 23a. The sub-capacitor main part 20A is thus structured.

The sub-capacitor 20 can be formed as an assembly (semi-finished product) that can be handled independently.

The first electrode plate body 22a has the first electrode plate terminals 22c as the cathode on the free-end side via the first electrode plate extensions 22b. The second electrode plate body 23a has the second electrode plate terminals 23c as the anode on the free-end side via the second electrode plate extensions 23b. The first electrode plate terminals 22c as the cathode and the second electrode plate terminals 23c as the anode are paired.

The first and second electrode plate extensions 22b, 23b, a cathode and anode pair, are planarly opposed to each other in a close but non-contacting manner so as to be in parallel and insulated from each other. An insulating sheet (not shown) is interposed in the gap between the plate conductor extensions 22b, 23b.

The first and second electrode plate extensions 22b, 23b are both a plurality of branched lingulate pieces each having an inverted L-shape. From the first and second electrode plate extensions 22b, 23b, a plurality of first and second electrode plate terminals 22c, 23c are branched respectively, each in a lingulate and inverted L-shape.

The first electrode plate extensions 22b and the second electrode plate extensions 23b are disposed at substantially the same height with a horizontal gap from each other. Each electrode plate extension 22b is disposed at an intermediate position between adjacent second electrode plate extensions 23b. Each second electrode plate extension 23b is disposed at an intermediate position between adjacent first electrode plate extensions 22b.

The first electrode plate terminals 22c and the second electrode plate terminals 23c are disposed at substantially the same height with a horizontal gap from each other. Each first electrode plate terminal 22c is disposed at an intermediate position between adjacent second electrode plate terminals 23c. Each second electrode plate terminal 23c is disposed at an intermediate position between adjacent first electrode plate terminals 22c.

The main capacitor main part 10A and the sub-capacitor main part 20A are disposed in close proximity to each other. The sub-capacitor main part 20A is disposed in parallel and in close proximity to one of the planar side surfaces, i.e., the outer circumferential side surfaces, of the main capacitor main part 10A having a substantially cuboidal shape. Here, the sub-capacitor main part 20A is in an upright position. As shown in FIG. 2C, the extensions of four categories, namely, the second plate conductor extension 13b, the first plate conductor extension 12b, the first electrode plate extensions 22b, and the second electrode plate extensions 23b are opposed to and overlaid on each other in the horizontal direction.

The first plate conductor extension 12b and the first electrode plate extensions 22b are opposed and in adjacent to each other. The second plate conductor extension 13b and the second electrode plate extensions 23b externally catch the first plate conductor extension 12b and the first electrode plate extensions 22b between them. Thus, between the first and second plate conductor extensions 12b, 13b and the first and second electrode plates 22b, 23b, the extensions of the same polarity attain the same position. Therefore, the extensions of the same polarity are electrically and mechanically connected to each other.

The second plate conductor 13 and the second electrode plate 23 are opposed and in adjacent to each other. Alternatively, the first plate conductor 12 and the first electrode plate 22 may externally catch the second plate conductor 13 and the second electrode plate 23 between them.

The first and second plate conductor extensions 12b, 13b are opposed to each other in parallel. The first and second electrode plate extensions 22b, 23b are opposed to each other in parallel. The first and second plate conductor extensions 12b, 13b and the first and second electrode plate extensions 22b, 23b are planarly opposed to each other in a close but non-contacting manner so as to be in parallel and insulated from each other.

The first plate conductor terminals 12c and the first electrode plate terminals 22c are overlaid on each other. The second plate conductor terminals 13c and the second electrode plate terminals 23c are overlaid on each other.

The first plate conductor terminals 12c and the first electrode plate terminals 22c, both of which are cathode and are opposed to and overlaid on each other on the inner side, are disposed lower. The second plate conductor terminals 13c and the second electrode plate terminals 23c, both of which are anode and are opposed to and overlaid on each other on the outer side, are disposed higher.

A plurality of first and second plate conductor terminals 12c, 13c in the main capacitor 10 and a plurality of first and second electrode plate terminals 22c, 23c in the sub-capacitor 20 are in contact with each other by the terminals of the same polarity. The terminals each have a through fastening hole for inserting a fastening element such as a bolt. The fastening holes of the terminals in contact with each other concentrically overlap with each other. The overlaid terminals may be electrically and mechanically connected to each other by soldering or the like before being fastened. Alternatively, they can be firmly pressed together by fastening and thus be electrically and mechanically connected to each other.

As shown in FIG. 1, the capacitor main part 10A is housed in an outer case 30 made of resin. Molding resin 40 is injected into the outer case 30. The molding resin 40 covers and protects the entire capacitor unit U, the entire first and second plate conductor bodies 12a, 13a, and the lower vertical portion of the first and second plate conductor extensions 12b, 13b. This prevents air from entering between the plate conductors (between the electrodes) and stabilizes product quality.

Figure 8:
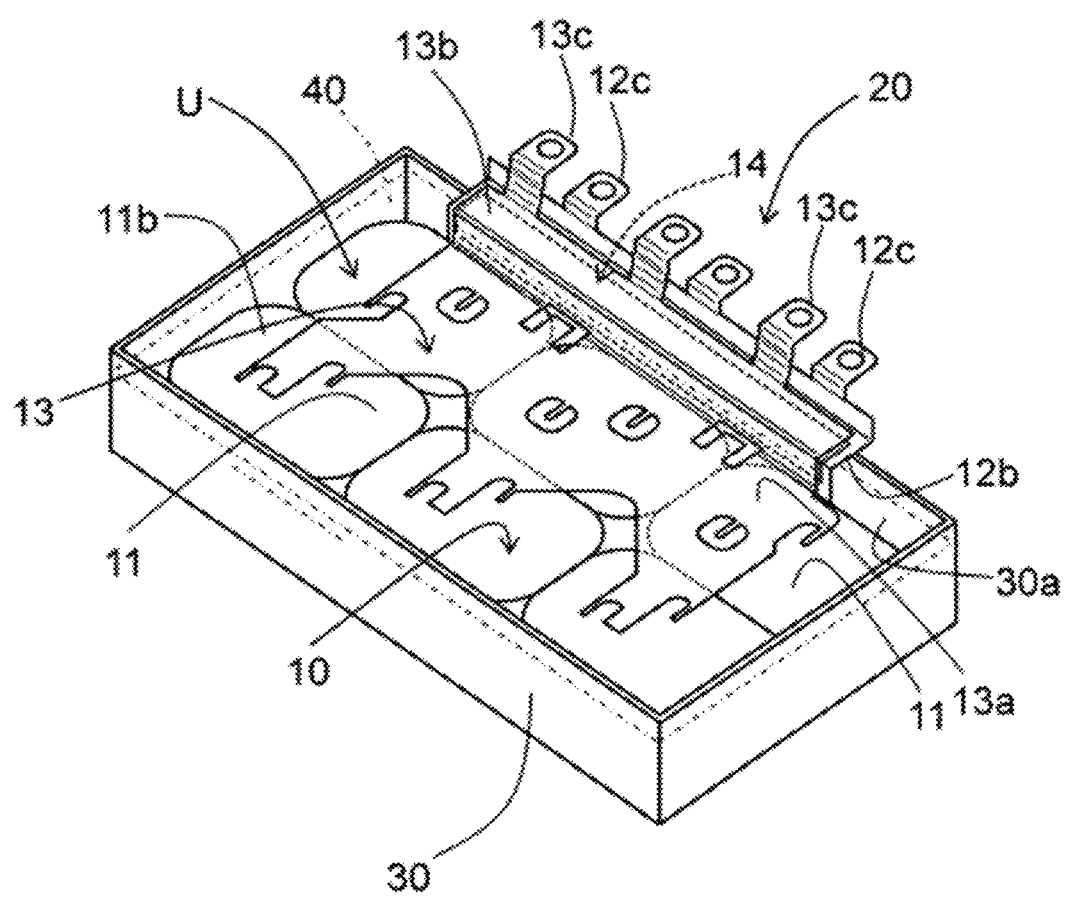
FIG. 8 is a perspective view of a capacitor main part according to the embodiment housed in an outer case.
Figure 9:
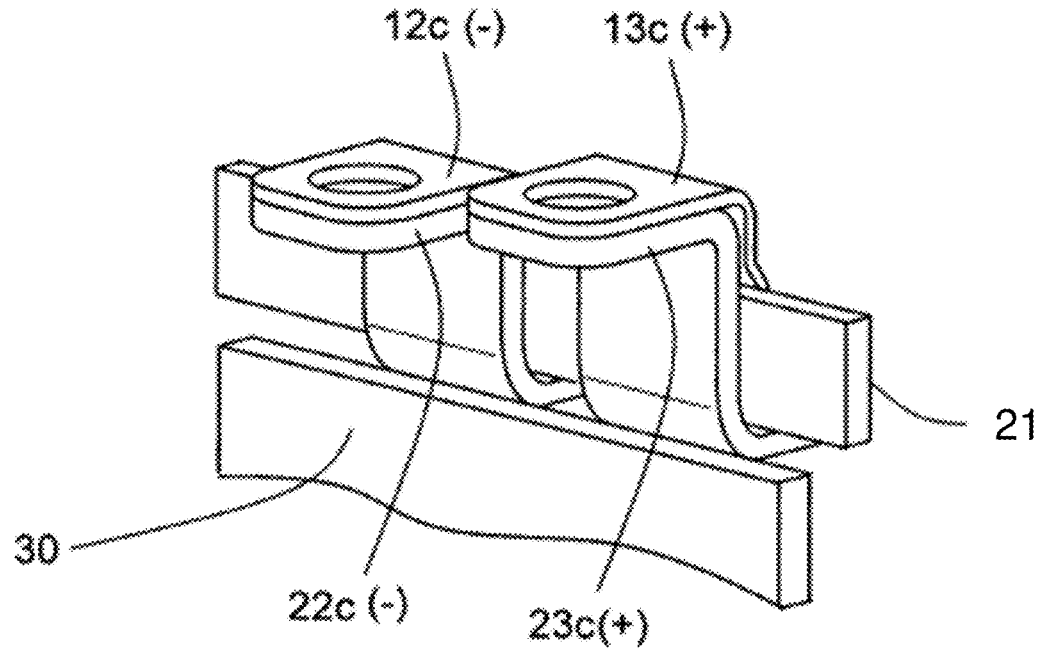
FIG. 9 is a perspective view showing electrical and mechanical connections between a first plate conductor terminal and a first electrode plate terminal and between a second plate conductor terminal and a second electrode plate terminal overlaid on each other.
Figure 10:
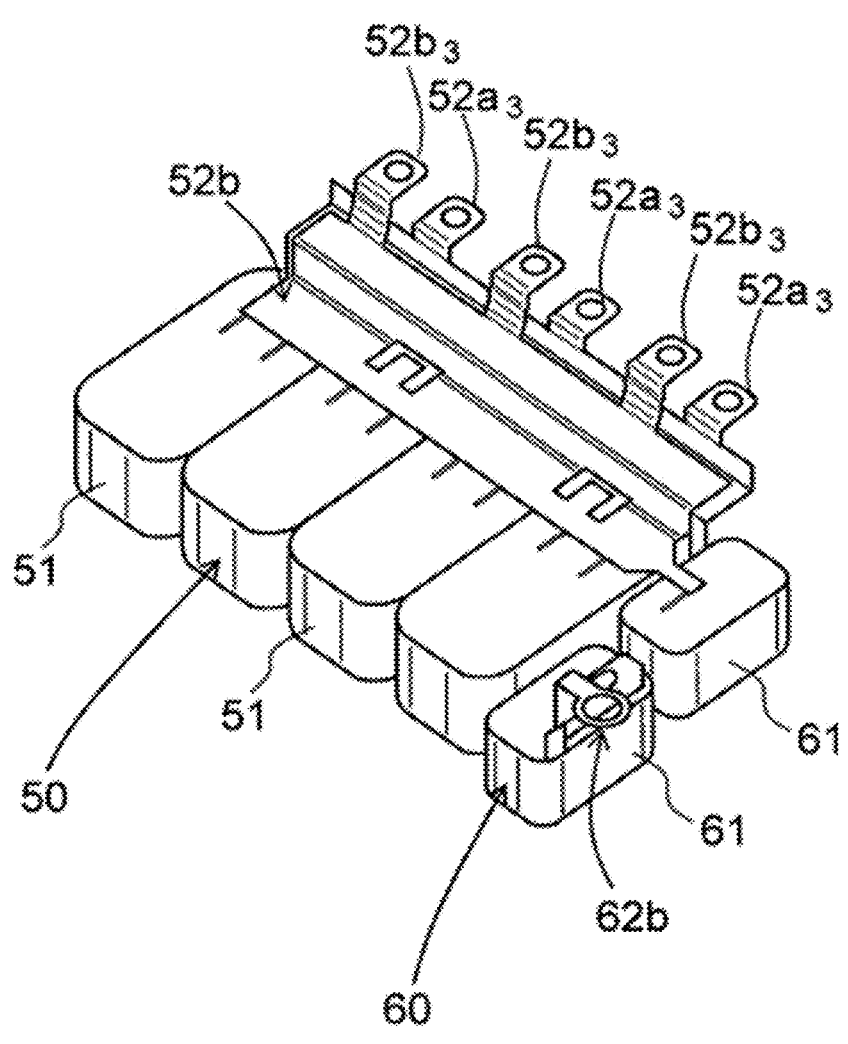
FIG. 10 is a perspective view of a composite capacitor main part according to a conventional example.
Figure 11:
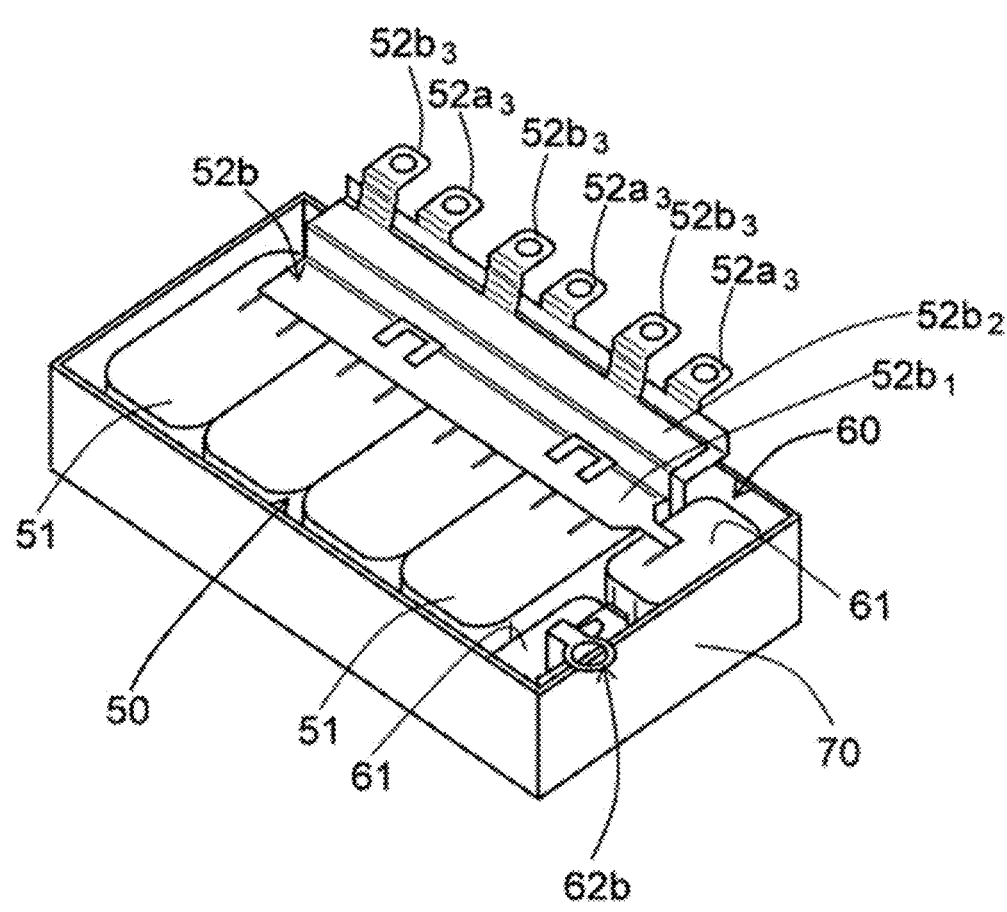
FIG. 11 is a perspective view of the capacitor main part according to the conventional example housed in an outer case.
Figure 12:
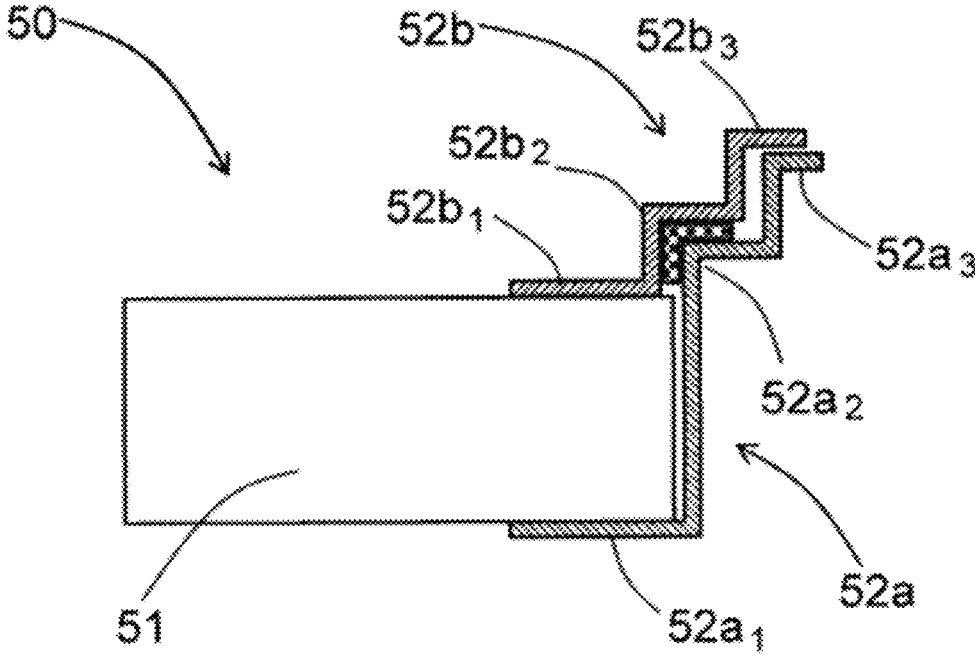
FIG. 12 is a vertical cross-sectional view of the composite capacitor according to the conventional example.

The lower vertical portion of the first and second plate conductor extensions 12b, 13b extends along the inner surface of a side plate 30a of the outer case 30. As shown in FIG. 8, the higher horizontal portion of the first and second plate conductor extensions 12b, 13b is disposed along the upper end surface of the side plate 30a. The higher horizontal portion of the first and second plate conductor extensions 12b, 13b is positioned on the outer side of the outer case 30 with the first and second plate conductor terminals 12c, 13c.

In this manner, the main capacitor 10 with a relatively large capacitance and the sub-capacitor 20 with a relatively small capacitance are combined with each other to structure a composite capacitor. The sub-capacitor 20 is connected in parallel with the main capacitor 10 via the first and second electrode plate terminals 22c, 23c and the first and second plate conductor terminals 12c, 13c.

The sub-capacitor 20 is a parallel plate capacitor in which the sheet dielectric 21 is held in the gap between the opposed first and second electrode plate bodies 22a, 23a. This achieves the micro-capacitance that can address high-frequency noise.

The parallel-plate sub-capacitor 20 occupies less space than the metallized-film main capacitor 10. Furthermore, since the sub-capacitor main part 20A has a thin and flat shape, it can be easily disposed in close proximity to and along the side surface of the bulky main capacitor main part 10A. This simplifies both the structure and the layout space. Thus, the present embodiment greatly reduces high-frequency noise and the burden in terms of space and cost.

The composite capacitor according to the embodiment has a simple shape and a compact structure.

The sub-capacitor 20 according to the embodiment is a parallel plate capacitor with a smaller capacitance than the conventional example, i.e., a metallized film capacitor of the same type as the main capacitor 10. This achieves the micro-capacitance that can handle the recent high-frequency switching operations. It also reduces high-frequency noise.

The electrode plates of the parallel plate sub-capacitor 20 may be made of a material similar to that of the plate conductors. Thus, in contrast to ceramic capacitors, the present embodiment meets the requirement of withstanding higher voltages.

The specifications of the sheet dielectric 21 are, for example, 0.1 to 5 mm in thickness and 1 to 20 cm$^2$ in area. The material of the sheet dielectric 21 is, for example, PP (polypropylene), PBT (polybutylene terephthalate), and PPS (polyphenylene sulfide). In this case, the dielectric constant ε is 2 to 4, the capacitance is 0.1 to 500 [pF], and the frequency of high-frequency noise that can be rejected is 50 MHz or higher.

While the present embodiment exemplarily shows the case-molding type, the present invention is also applicable to the caseless type.

The noise suppression sub-capacitor 20 may be disposed only inside or outside the outer case 30, or continuously inside and outside the outer case 30.

While the capacitor unit U according to the embodiment is explained as a group of capacitor elements 11 arranged in a matrix, the present invention includes a plurality of capacitor elements 11 in a row, a plurality of capacitor elements 11 in a column, and a single capacitor element 11.

Note that, the term "parallel" in the present invention is not limited by straightness or flatness. That is, the present invention is not limited to a state where flat surfaces are disposed with a predetermined distance from each other, but also a state where curved surfaces are disposed with a predetermined distance from each other. For example, "parallel" includes a curved state where the surfaces smoothly curve, a bent state where the surfaces change their directions at a certain angle, and various curved or bent states where the foregoing are mixed.

In addition, the term "planarly opposed" limits the mode "parallel". It refers to the state in which one plate conductor extension or electrode plate extension is opposed in parallel to the other plate conductor extension or electrode plate extension with a distance from each other in the direction perpendicular to their planar surfaces.

REFERENCE SIGNS LIST

10 main capacitor
10A main capacitor main part

11 capacitor element
11a first metal electrode
11b second metal electrode
12 first plate conductor
13 second plate conductor
12a first plate conductor body
12b first plate conductor extension
12c first plate conductor terminal
13a second plate conductor body
13b second plate conductor extension
13c second plate conductor terminal
14 sheet dielectric
20 sub-capacitor (for suppressing noise)
20A sub-capacitor main part
21 sheet dielectric
22 first electrode plate
22a first electrode plate body
22b first electrode plate extension
22c first electrode plate terminal
23 second electrode plate
23a second electrode plate body
23b second electrode plate extension
23c second electrode plate terminal
30 outer case
40 molding resin
U capacitor unit

The invention claimed is:
1. A composite capacitor comprising:
a main capacitor including
a capacitor element formed of a wound or laminated metallized film made up of a dielectric film and electrodes deposited on the dielectric film, the capacitor element including first and second metal electrodes at its axial ends,
a first plate conductor including a first plate conductor body connected to the first metal electrode, a first plate conductor extension extending from the first plate conductor body, and a first plate conductor terminal extending from the first plate conductor extension, and
a second plate conductor including a second plate conductor body connected to the second metal electrode, a second plate conductor extension extending from the second plate conductor body, and a second plate conductor terminal extending from the second plate conductor extension; and
a parallel plate sub-capacitor smaller in capacitance than the main capacitor, the sub-capacitor including
a first electrode plate including a first electrode plate body, a first electrode plate extension extending from the first electrode plate body, and a first electrode plate terminal extending from the first electrode plate extension and connectable to the first plate conductor terminal,
a second electrode plate including a second electrode plate body disposed in parallel with the first electrode plate body with a predetermined minor gap, a second electrode plate extension extending from the second electrode plate body, and a second electrode plate terminal extending from the second electrode plate extension and connectable to the second plate conductor terminal, and
a sheet dielectric held between the first electrode plate body and the second electrode plate body,
wherein
the first and second plate conductor terminals are both a plurality of branched and projecting lingulate pieces, the first plate conductor terminals are each disposed at an intermediate position between adjacent ones of the second plate conductor terminals, the first and second electrode plate terminals are both a plurality of branched and projecting lingulate pieces, the first electrode plate terminals are each disposed at an intermediate position between adjacent ones of the second electrode plate terminals, the first plate conductor terminals and the first electrode plate terminals are overlaid on each other, and the second plate conductor terminals and the second electrode plate terminals are overlaid on each other.

2. The composite capacitor according to claim 1, wherein the sub-capacitor is disposed in parallel with one of outer circumferential side surfaces of the main capacitor.

3. The composite capacitor according to claim 2, wherein the first plate conductor extension and the second plate conductor extension are planarly opposed to each other in a close but non-contacting manner so as to be in parallel and insulated from each other, and the first electrode plate extension and the second electrode plate extension are planarly opposed to each other in a close but non-contacting manner so as to be in parallel and insulated from each other.

4. The composite capacitor according to claim 2, wherein the sheet dielectric has a dielectric constant in a range of 2 to 4.

5. The composite capacitor according to claim 2, further comprising an outer case for housing the main capacitor and the sub-capacitor, wherein the main capacitor and the sub-capacitor are covered with molding resin injected into the outer case.

6. The composite capacitor according to claim 1, wherein the first plate conductor extension and the second plate conductor extension are planarly opposed to each other in a close but non-contacting manner so as to be in parallel and insulated from each other, and the first electrode plate extension and the second electrode plate extension are planarly opposed to each other in a close but non-contacting manner so as to be in parallel and insulated from each other.

7. The composite capacitor according to claim 6, wherein a pair of the first and second plate conductor extensions and a pair of the first and second electrode plate extensions are planarly opposed to each other in a close but non-contacting manner so as to be in parallel and insulated from each other.

8. The composite capacitor according to claim 7, wherein the sheet dielectric has a dielectric constant in a range of 2 to 4.

9. The composite capacitor according to claim 7, further comprising an outer case for housing the main capacitor and the sub-capacitor, wherein the main capacitor and the sub-capacitor are covered with molding resin injected into the outer case.

10. The composite capacitor according to claim 6, wherein the sheet dielectric has a dielectric constant in a range of 2 to 4.

11. The composite capacitor according to claim 6, further comprising an outer case for housing the main capacitor and the sub-capacitor, wherein the main capacitor and the sub-capacitor are covered with molding resin injected into the outer case.

12. The composite capacitor according to claim 1, wherein the sheet dielectric has a dielectric constant in a range of 2 to 4.

13. The composite capacitor according to claim 12, further comprising an outer case for housing the main capacitor and the sub-capacitor, wherein the main capacitor and the sub-capacitor are covered with molding resin injected into the outer case.

14. The composite capacitor according to claim 1, further comprising an outer case for housing the main capacitor and the sub-capacitor, wherein the main capacitor and the sub-capacitor are covered with molding resin injected into the outer case.

* * * * *